US012407085B2

(12) United States Patent
Qu et al.

(10) Patent No.: US 12,407,085 B2
(45) Date of Patent: Sep. 2, 2025

(54) LIGHTING DEVICE WITH A BUILT IN ANTENNA

(71) Applicant: SIGNIFY HOLDING B.V., Eindhoven (NL)

(72) Inventors: Shanshan Qu, Shanghai (CN); Yue He, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 132 days.

(21) Appl. No.: 18/557,609

(22) PCT Filed: Apr. 15, 2022

(86) PCT No.: PCT/EP2022/060166
§ 371 (c)(1),
(2) Date: Oct. 27, 2023

(87) PCT Pub. No.: WO2022/228920
PCT Pub. Date: Nov. 3, 2022

(65) Prior Publication Data

US 2024/0213654 A1 Jun. 27, 2024

(30) Foreign Application Priority Data

Apr. 27, 2021 (WO) ................ PCT/CN2021/090342
Jul. 13, 2021 (EP) .................................... 21185237

(51) Int. Cl.
*H01Q 1/22* (2006.01)
*F21K 9/232* (2016.01)
(Continued)

(52) U.S. Cl.
CPC ............... *H01Q 1/22* (2013.01); *F21K 9/232* (2016.08); *F21V 23/045* (2013.01); *H01Q 5/40* (2015.01);
(Continued)

(58) Field of Classification Search
CPC .. H01Q 1/22; H01Q 5/40; H01Q 1/44; H01Q 5/321; H01Q 9/30; F21K 9/232;
(Continued)

(56) References Cited

U.S. PATENT DOCUMENTS 10,020,833 B2 * 7/2018 Nourbakhsh ............ H04B 1/38
2017/0059095 A1 * 3/2017 Van Bommel .......... F21K 9/232
(Continued)

FOREIGN PATENT DOCUMENTS

CN 203675107 U 6/2014
DE 202016106403 U1 2/2018
(Continued)

*Primary Examiner* — Minh Tran

(57) ABSTRACT

A lighting device (such as a LED bulb) has a light source (18), a base part (12) and an upper part (62) mounted over the base part (12) with an internal volume (64) defined between them. Within the internal volume (64) there is a two-segment antenna. A first antenna segment (40) extends outwardly from the base part (12) towards the internal volume (64) and a second antenna segment (50) is held by the upper part (62) and mounted partially over the first antenna segment (40). The first and second antenna segments (40, 50) are physically separated but electrically coupled.

15 Claims, 6 Drawing Sheets

(51) Int. Cl.

| | |
|---|---|
| ***F21V 23/04*** | (2006.01) |
| ***H01Q 5/40*** | (2015.01) |
| *F21Y 107/00* | (2016.01) |
| *F21Y 115/10* | (2016.01) |

(52) U.S. Cl.
CPC ....... *F21Y 2107/00* (2016.08); *F21Y 2115/10* (2016.08)

(58) Field of Classification Search
CPC .... F21K 9/238; F21V 23/045; F21Y 2107/00; F21Y 2115/10
See application file for complete search history.

(56) References Cited

U.S. PATENT DOCUMENTS

| | | | |
|---|---|---|---|
| 2019/0056072 A1 | 2/2019 | Gielen et al. | |
| 2019/0086037 A1* | 3/2019 | Cairns | F21V 23/006 |
| 2021/0164621 A1 | 6/2021 | Wang et al. | |

FOREIGN PATENT DOCUMENTS

| | | | |
|---|---|---|---|
| JP | 2015517183 | A | 6/2015 |
| JP | 2016523020 | A | 8/2016 |
| JP | 2018504016 | A | 2/2018 |
| KR | 20110031134 | A | 3/2011 |
| WO | 2013014821 | A1 | 1/2013 |
| WO | 2016146339 | A1 | 9/2016 |

* cited by examiner

LIGHTING DEVICE WITH A BUILT IN ANTENNA

CROSS-REFERENCE TO PRIOR APPLICATIONS

This application is the U.S. National Phase application under 35 U.S.C. § 371 of International Application No. PCT/EP2022/060166, filed on Apr. 15, 2022, which claims the benefit of International Application No. PCT/CN2021/090342, filed on Apr. 27, 2021 and European Patent Application Ser. No. 21/185,237.1, filed on Jul. 13, 2021. These applications are hereby incorporated by reference herein.

FIELD OF THE INVENTION

The invention relates to a lighting device, such as a LED lamp, which incorporates an antenna.

BACKGROUND OF THE INVENTION

Wireless control of light sources both for indoor and outdoor applications is becoming increasingly popular. Intelligent lighting has become widespread, and RF communication is a powerful technology used in this remote management of lamps, in particular for domestic and office environments.

By using wireless control, instead of controlling the power supply to the lamp, the light source can be controlled directly by sending an RF control signal to the lighting device.

Glass bulbs such as filament bulbs are widely used in the market, but how to make these bulbs wirelessly connected is a big challenge. In order to have a good appearance, all of the electronic components are preferably placed within the compact bottom space surrounded by the electrical connection cap.

However, an antenna for wireless connectivity has to be placed above the cap because the metal material of the cap will prevent the radio signal from successful transmission and reception. Additionally the volume of the cap is too small to accommodate an antenna with sufficient length for popular communication standards in the frequency band of 2.5 GHz or 5 GHz.

A wire (e.g. loop) antenna is the most common design since it is easy to make, has a small impact on the appearance and a low cost. However, it still has several disadvantages that make it difficult to achieve a desired performance.

In particular, the antenna has poor radiation performance. The antenna length is limited by the cavity height beneath a glass stem of the bulb, and this height is often not sufficient to meet the antenna length requirement to achieve a desired radiation efficiency. Even if some designs use a flexible wire to achieve a suitable length, the position and shape of the antenna is not accurately controlled in that case, which means the radiation performance is also not well-defined.

If a long antenna is mounted on the cap side of a lamp it may be difficult to keep prevent damage of the antenna when assembling the cap with the stem, since the antenna may contact the stem and be bent or broken.

The performance sensitivity and stability also may be poor after assembly. The antenna radiation efficiency and pattern are for example influenced significantly by nearby power cables. Therefore, the performance stability is highly dependent on the assembly process, and it is almost impossible to manage this stability during manufacturing.

SUMMARY OF THE INVENTION

The invention is defined by the claims.

It is a concept of the invention to provide a lighting device with an antenna which is formed as two segments. One segment extends from a base of the lighting device, for example where the electrical connector and circuitry are located. Another segment is retained by a upper part which fits over the base. The two segments are physically separated but alongside each other so that there is electromagnetic coupling between them. This simplifies assembly, via reducing the risk of a bend or broken long antenna, as well as enabling a longer antenna than would normally fit within a space defined by the upper part, such a longer antenna being able to communicate in a lower frequency band that satisfies certain communication standards.

According to examples in accordance with an aspect of the invention, there is provided a lighting device comprising

- a light source;
- a base part; and
- an upper part mounted over the base part, wherein there is an internal volume between the base part and the upper part,
- the lighting device further comprising, located within the internal volume:
  - a first antenna segment having a first length extending outwardly from the base part towards the internal volume: and
  - a second antenna segment held by the upper part and mounted partially over the first antenna segment, having a second length parallel with the first length, the first and second antenna segments being physically separated but electrically coupled via a non-contact electric and/or magnetic field electrical coupling, wherein the second antenna segment extends outwardly beyond the end of the first antenna segment.

This lighting device incorporates a two-part antenna. A first segment is for example located within an enclosed area defined between the base part and the upper part, whereas the second segment extends further towards the internal volume. In this way, the antenna length can be extended. The physical separation of the antenna segments makes assembly simpler, in that the second antenna segment is formed as part of the upper part whereas the first antenna segment is formed as part of the base part. The antenna function is completed by assembling the lighting device. Since the antenna is not a single long antenna, but two non-contacting segments, they are easier to be assembled in the lighting device without a risk of bending or breaking a single antenna.

In addition, from one view point, the second antenna segment increases the antenna length, wherein the electrical coupling can be seen as a capacitive loading, and also provides another RF band besides the RF band of the first antenna segment alone. The two-part antenna design thereby enables a dual band operation to be implemented, and the working frequency can be easily tuned by design. From another view point, the second antenna segment is for example an electrically floating radiator. It couples a radio signal supplied to the first antenna segment, and excites target resonance modes. The two segments together determine a lower frequency band of the antenna.

The first antenna segment is for example sized to radiate a RF signal in a first frequency band, preferably including 5 GHZ, and the first segment and the second segment together are sized to radiate a RF signal in a second frequency band lower than the first frequency band, preferably including 2.4

GHz. 5 GHZ may be suitable for 5G Wi-Fi, and 2.4 GHz may be suitable for 2.4G Wi-Fi, Zigbee, Bluetooth. These frequency bands are is only by way of example, and those skilled in the art can select other values of the frequency bands.

The electrical coupling is for example a capacitive coupling.

Preferably, the coupling coefficient of the capacitive coupling influences the second frequency with an inverse relationship. The capacitive coupling can be seen as an RF load in the effective antenna formed by the first antenna segment combined with the second antenna segment. Based on simulations and experiments, the higher the coupling coefficient, the smaller the second frequency. Thus, by adjusting the coupling coefficient, the second frequency band can be fine-tuned.

In a simple implementation, the capacitive coupling is formed by a length of overlap between the first and second antenna segments, and the material and spacing between them. Thus by adjusting the length of overlap, the dielectric constant of the material and/or the distance between the first and second antenna segments, the second frequency band can be fine-tuned.

In a detailed embodiment, the first antenna segment may comprise a base portion near the base part and an end portion, and the second antenna segment comprises a coupling portion and a radiator portion further from the base portion than the coupling portion, and, in between the base portion and the radiator portion, the end portion and the coupling portion are adjacent along their length direction thereby to form the electrical coupling.

The radiator portion means the combination of the first and second antenna segments extends the length of the antenna compared to the first antenna segment alone, and thus provides a second, lower, frequency band.

As to the implementation of the overlapping, the end portion and the coupling portion may be side-by-side linear structures or else the end portion may comprise a linear structure and the coupling portion comprises a tubular structure around the end portion.

Thus, different designs are possible for the overlapping parts of the two antenna segments. In both of these cases, the design may be such that the upper part (which mounts the second antenna segment) can be mounted over the base part (which houses the first antenna segment) in any rotational orientation while maintaining a same resulting antenna function. The embodiment of side-by-side linear structure is simple to assemble, while the tubular example has an advantage of improved coupling coefficient, since the coupling is three-dimensional, and may increase the gain of the second frequency band.

The radiating portion for example comprises a linear structure or else a linear structure with a perpendicular end piece. The optional end piece provides top loading of the antenna, for increasing the electrical length of the antenna and/or tuning the input impedance.

The length of the first antenna segment may correspond approximately to a quarter wavelength of a first frequency, such as a central frequency, in the first (higher) frequency band, and the combined length of the base portion and the radiator portion may correspond approximately to a quarter wavelength of a second frequency, such as a central frequency, in the second (lower) frequency band.

Thus, the combined length of the two antenna segments, but excluding the area where they couple together (which functions as a capacitive coupling) may be designed based on the desired frequency of the second (lower) frequency band. The capacitive coupling will however also influence the frequency characteristics. The first antenna segment length may be designed based on the desired frequency of the first (higher) frequency band. This quarter wavelength is based on a condition that the first antenna segment and the combined first and second antenna segments are monopole antennas. If they are implemented using another type of antenna structure, those skilled in the art may design their lengths accordingly to meet the length requirements of the other type of antenna structure.

The lighting device may further comprise an electrical connector cap adapted to be connected to an external power supply, and the base part at least partially fits into the electrical connector cap at a side opposite from the first antenna segment.

The base part for example houses electrical circuitry for the lamp, by placing the electrical circuitry between the side opposite from the first antenna segment and the cap. Thus, the electrical circuitry is not externally visible as it is within the connector cap, and gives a clear appearance of the lighting device without showing the electrical circuitry.

Preferably, there is an interface structure between the electrical circuitry and the cap.

The lighting device preferably further comprises a lamp envelope to be sealed with the upper part so as to accommodate the light source. The sealing is for protecting the light source from ambient dust, moisture, etc. Preferably, noble gas may be filled into the sealed space to protect the light source from oxidation, as well as to dissipate heat.

The lamp envelope for example has a bulb shape. The upper part, at a side facing the envelope, for example comprises a glass stem projecting towards (and into) the lamp envelope.

The glass stem for example functions as a support for the light source.

The glass stem may comprise a plurality of hanging branches for hanging the light source, wherein the light source comprises a LED strip or LED filament. Thus, the lighting device may comprise a LED filament bulb.

This makes the LED filament bulb have an appearance which matches traditional incandescent lamps.

The upper part may comprise a dome structure which fits over the base part, wherein the dome structure is adapted to provide the internal volume into which the first antenna segment projects and in which the second antenna segment is suspended.

The internal volume thus defines a space between the base part and the upper part.

The dome structure provides a clear space for accommodating the two antenna segments.

The first antenna part is thus physically separated from the envelope of the lighting device by the upper part, and is located in the internal volume formed over the base part. The upper part is for example a glass component for closing an internal cavity formed by the lamp envelope.

The upper part for example comprises a concave portion and the glass stem (which is over-molded over the second antenna segment) may be suspended within the internal volume defined by that concave portion. The overlap between the first and second antenna segments is within that internal volume.

The lighting device may further comprise an insulating over-molding sleeve adapted to wrap at least part of the second antenna segment.

The second antenna segment is for example an over-molded radiator within this sleeve, which may be considered to be a part of the glass stem which extends inwardly into the internal volume rather than outwardly into the lamp envelope. Because of the high dielectric coefficient of glass, the physical size of the antenna can be reduced. The over-molded glass surround also prevents power cables for the light source touching the antenna and creates a clearance space. Thus, detuning from power cables is reduced.

In one example, the second antenna segment is fully within the internal cavity defined by the upper part. Alternatively, the second antenna segment may instead extend above the dome structure, for example into the stem which extends into the envelope. The antenna design then further overcomes a problem of a space limitation of the enclosed internal volume between the base part and the upper part. This extended length may be suitable for a desired second frequency band.

The base part may comprise a RF transceiver circuit which couples to the first antenna segment and a lighting driver for driving the light source.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
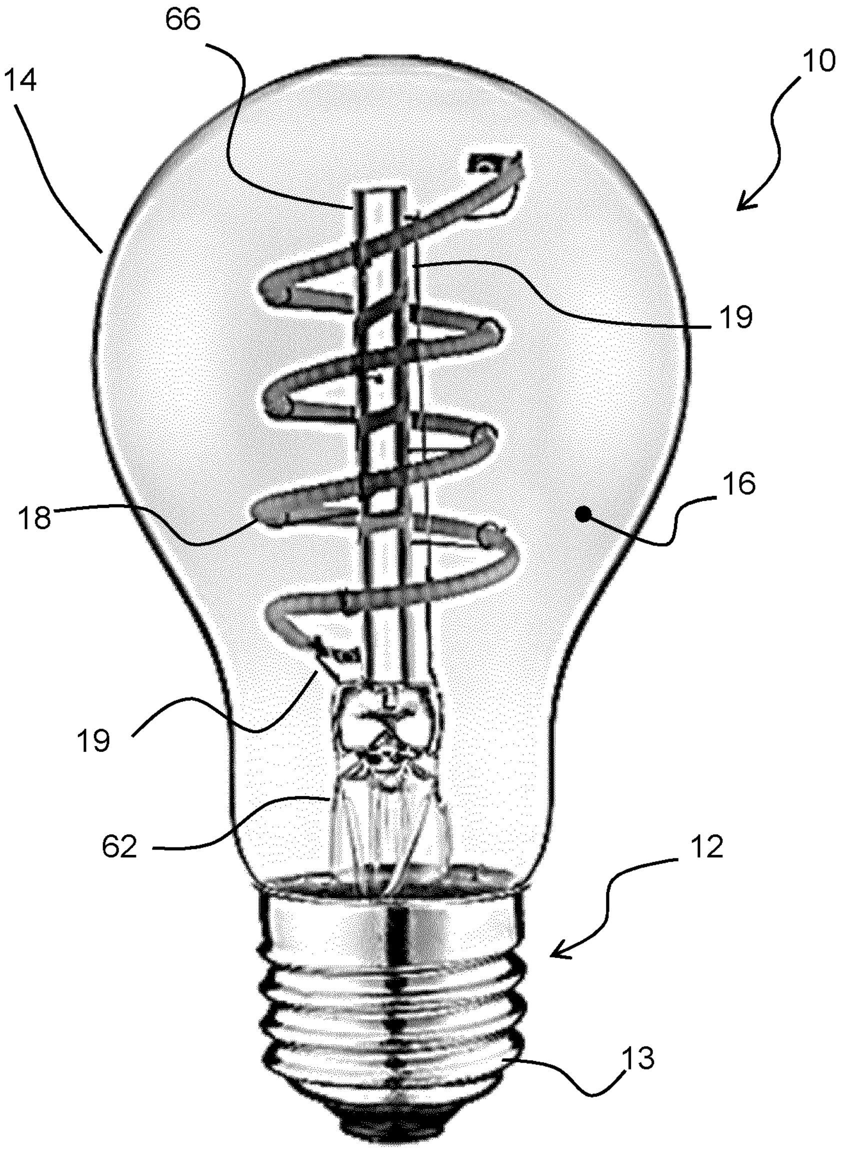
FIG. 1 shows a known lighting device.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a lighting device (such as a LED bulb) which has a light source, a base part and an upper part mounted over the base part with an internal volume defined between them. Within the internal volume there is a two-segment antenna. A first antenna segment extends outwardly from the base part towards the internal volume and a second antenna segment is held by the upper part and mounted partially over the first antenna segment. The first and second antenna segments are physically separated but electrically coupled.

FIG. 1 shows a known lighting device 10, in the form of a LED filament bulb.

The lighting device 10 comprises a base part 12 which is surrounded by an electrical connector cap 13 (shown as a screw thread fitting in this example). The electrical connector cap 13 is for connecting the lighting device to an external power supply.

The base part at least partially fits into the electrical connector cap 13 and it houses electrical circuitry for the lighting device, which is not externally visible as it is within the connector cap 13.

A lamp envelope 14 is provided over the base part 12 and defines a cavity 16 in which the light source 18 (a LED filament in this example) is housed. Electrical connector wires 19 connect to the ends of the LED filament.

Figure 6:
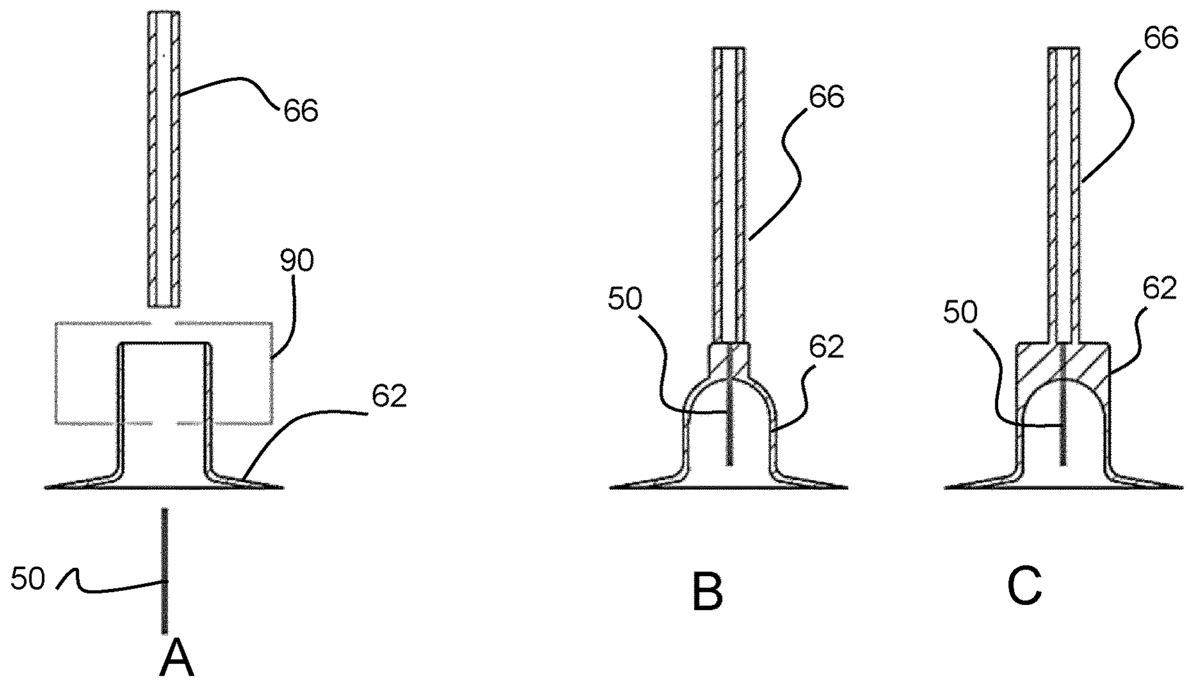
FIG. 6 shows the over-molding assembly process.

The cavity 16 defined by the lamp envelope 14 is sealed, in particular with an upper part 62 over the base 12 (the sealing is shown more clearly in the first drawing in FIG. 6). The lamp envelope 14 has a bulb shape in this example. The upper part 62, at a side facing into the lamp envelope 14, comprises a glass stem 66 which projects into the lamp envelope 14.

The glass stem 66 for example functions as a support for the light source 18. For the example of a LED strip or filament, the glass stem has a plurality of hanging branches for hanging the light source.

The invention relates in particular to a lighting device which incorporates an antenna, to enable wireless communication with the lighting device, for example for remote control of the lighting device without the need for the lighting device to form part of a wired network.

In a known lighting device such as shown in FIG. 1, an antenna such as a wire loop antenna may be located within a space beneath the upper part 62.

Figure 2:
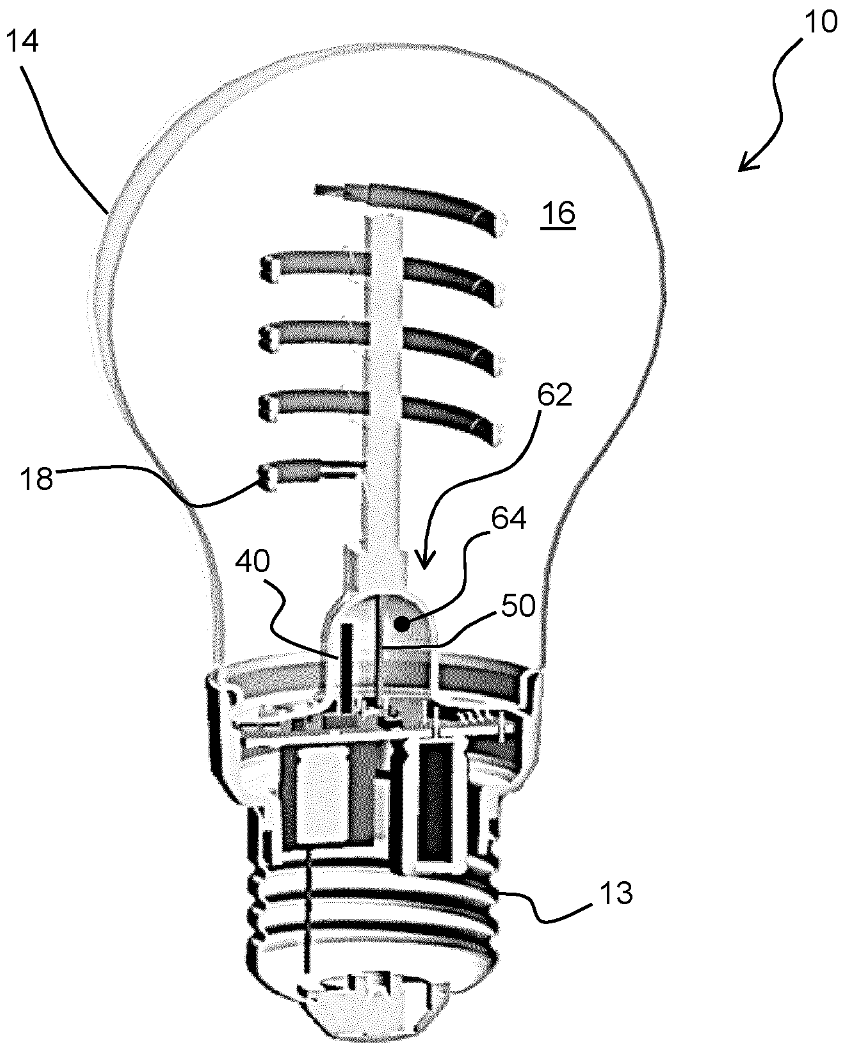
FIG. 2 shows an example of a lighting device in accordance with the invention.

FIG. 2 shows an example of a lighting device in accordance with the invention.

The same components are given the same reference numbers as in FIG. 1.

Thus, the lighting device 10 again comprises a base part 12 within an electrical connector cap 13, a lamp envelope 14 provided over the base part 12 defining a cavity 16 in which the light source 18 is housed.

It can be seen in FIG. 2 that the upper part 62 over the base 12 defines an internal volume 64 between the base part 12 and an outer periphery of the upper part 62, wherein the term "outer periphery" meaning outside of the internal volume 64. The glass stem 66 extends outwardly from the top of the upper part 62 and projects into the cavity 16 defined by the lamp envelope 14.

In accordance with the invention, the lighting device comprises, within the internal volume 64, a first antenna segment 40 having a first length extending outwardly from the base part 12 towards and into the internal volume 64 and a second antenna segment 50 within the internal volume supported by (e.g. suspended) by the upper part 62.

The two antenna segments 40, 50 are alongside each other (at least in a coupling area between them). The second antenna segment 50 is mounted partially over the first antenna segment 40, and where they are alongside each other, they have portions parallel with each other. At this coupling area of overlap between the two antenna segments, they are physically separated, by which is meant that there is no direct electrical conductor connection between them.

They are however electrically coupled via a non-contact electric and/or magnetic field electrical coupling. In this way, a change in the electromagnetic field associated with the first antenna segment will induce a change in electromagnetic field associated with the second antenna segment.

The second antenna segment is for example an electrically floating radiator. It couples a radio signal supplied to the first antenna segment and excites target resonance modes, which mainly determine a lower frequency band of the antenna as explained further below:

The second antenna segment 50 extends outwardly beyond the end of the first antenna segment 40. In other words, the second antenna segment extends further toward the cavity defined by the lamp envelope than the first antenna segment. In this way, the antenna length can be extended.

The physical separation of the antenna segments makes assembly simpler, in that the second antenna segment 50 is formed as part of the upper part of the lighting device whereas the first antenna segment 40 is formed as part of the base part, but they do not need to be brought into physical mechanical or electrical contact. Since the antenna is not a single long antenna, but two non-contacting segments, they are easier to be assembled in the lighting device without a risk of bending or breaking.

Figure 3:
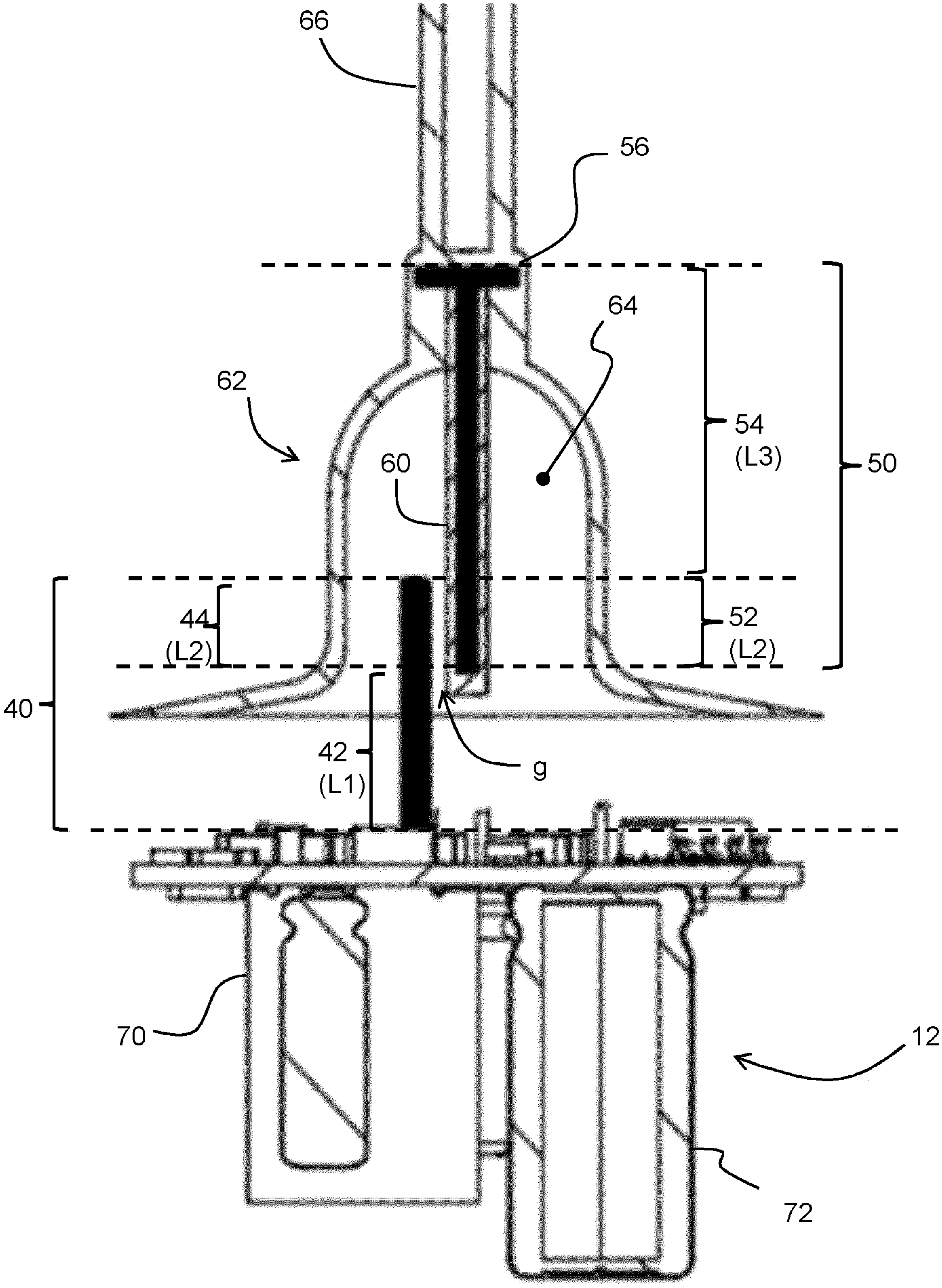
FIG. 3 shows the antenna structure in more detail.

FIG. 3 shows the antenna structure of FIG. 2 in more detail.

The first antenna segment 40 comprises a base portion 42 near the base part 12 with length L1 and an end portion 44 with length L2.

The first antenna segment is for example an upright relatively rigid column extending up from the base 12. It projects into the internal volume 64.

The second antenna segment 50 comprises a coupling portion 52 with length L2 and a radiator portion 54 further from the base portion than the coupling portion with length L3.

Between the base portion 42 and the radiator portion 54, the end portion 44 and the coupling portion 52 are adjacent to each other along their length direction thereby to form the electrical coupling discussed above.

As shown more clearly in FIG. 3, the upper part 62 comprises a concave dome structure which fits over the base part 12. The dome structure defines the internal volume 64 into which the first antenna segment 40 projects and in which the second antenna segment 50 is suspended. The upper part 62 is a glass component for closing the internal cavity 16 formed by the lamp envelope 14, around its rim, as shown in the first drawing in FIG. 6.

The glass stem 66 extends above the upper part 62 into the internal cavity. However, within the internal volume 64, there is an insulating over-molding sleeve 60 wrapped around at least part of the second antenna segment 50. The second antenna segment is for example formed by an over-molding process whereby a part of the glass stem 66 which extends inwardly into the internal volume 64 is over-molded over the second antenna segment.

Because of the high dielectric coefficient of glass, the physical size of the antenna can thereby be reduced. The glass surround also prevents power cables for the light source touching the antenna and creates a clearance space. Thus, detuning from power cables is reduced.

The radiating portion 54 may simply comprise a linear structure such as a another upright relatively rigid column extending down from the top of the internal volume 64. FIG. 3 instead shows the second antenna portion has a linear structure with a perpendicular end piece 56. The end piece provides top loading of the antenna, for increasing the electrical length of the antenna and/or tuning the input impedance. More specifically, a half of the length of the top loading end piece would be added to the length L3 of the radiator portion 54.

The use of two antenna segments in this way increases the antenna length and also provides another RF band besides the RF band of the first antenna segment alone. The two-part antenna design thereby enables a dual band operation to be implemented, and the working frequency can be easily tuned by design. The first antenna segment 40 is for example sized to radiate a RF signal in a first frequency band, preferably including 5 GHz, and the first segment 40 and the second segment 50 together are sized to radiate a RF signal in a second frequency band lower than the first frequency band, preferably including 2.4 GHz.

Figure 4:
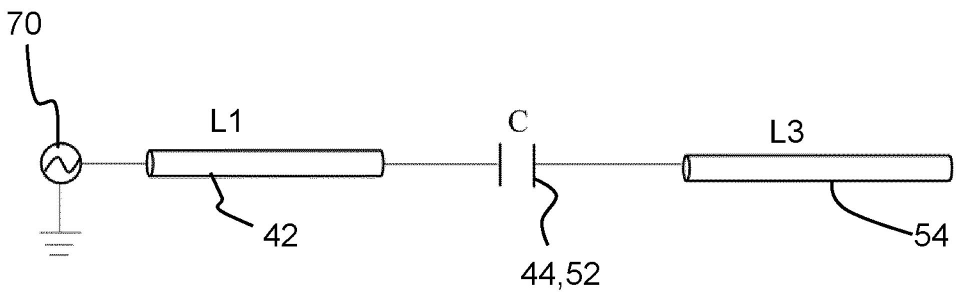
FIG. 4 shows an electrical model of the antenna function based on the combination of the two antenna segments.

FIG. 4 shows an electrical model of the antenna function based on the combination of the two antenna segments. It comprises a first radiator of length L1 (corresponding to the base portion), a capacitive coupling C (corresponding to the coupling between the end portion and the coupling portion) and a radiator of length L3 (corresponding to the radiator portion).

The first antenna segment 40 connects to the RF transceiver circuit 70 and creates an electric field for the second antenna segment. The first antenna segment has a length L1+L2 and this length mainly determines a higher resonance frequency of the antenna.

The floating second antenna segment 50 couples the radio signal from the first antenna segment (which functions as a primary radiator part) and excites further target resonance modes, which mainly determine the lower resonance frequency of the antenna. The combination of antenna segments also increases the antenna height and enhances the radiation.

The capacitive coupling defines a coupling coefficient dependent on the loading capacitance of the coupling area, which determined by the length L2, and the distance between the antenna segments.

The working frequency of the combined structure is relevant with the length L1 of the base portion 42, the length L3 of the radiator part 54, and the coupling. From a mathematical perspective, the working frequency of the combined structure as shown in FIG. 4 can be described as:

$$Freq = f(L1, L3, C)$$

L1 and L3 are the segment lengths explained above and shown in FIG. 4, and C is the equivalent capacitance between the antenna segments.

By increasing L1 or L3, the working frequency can be shifted to a lower band. A smaller value of C makes the working frequency higher.

Based on the known relationships between these design parameters and the desired working frequency, the design can be implemented with the following steps:

(i) Determine the length (L1+L2) of the first antenna segment, which is the primary radiator. The space is limited in the internal volume 64 and it sets a maximum length (L1+L2) of the first antenna segment. For a dual band antenna, the value of L1+L2 is chosen based on the required length to implement the higher frequency band, for example the length may be ¼ of the wavelength of a center frequency in the higher frequency band. If only single band operation is needed L1+L2 should be as long as possible (but no more than ¼ of the wavelength of the desired single working frequency). The largest voltage should be at the end of the antenna in the internal volume 64 to obtain the greatest possible excitation electric fields transferred to the second antenna segment.

(ii) Determine the length of the second (over-molded) antenna segment. This is the main radiator for the lower band in the case of a dual band antenna. The combined initial length (L1+L3) can be generally determined by ¼ of the wavelength of the lower working frequency (e.g. a center frequency in the lower frequency band). Because the glass provides a high effective dielectric constant, and the coupling effect helps to reduce the size, the length will be actually less than this quarter wavelength. However, the length may be set to the quarter wavelength and the working frequency can be tuned via the capacitive coupling strength (see (iii) below). A smaller coupling causes a higher resonance frequency, equivalent to providing a shorter antenna length.

(iii) Determine the coupling design. The coupling design will have an impact on the working frequency of both the lower band and the higher band, and a good coupling is a key part for good efficiency. The coupling is preferably at the free end of the first antenna segment because this results in the largest electric field, for coupling to the second antenna segment. A strong coupling area with its length L2 will then not have a large impact on the low frequency band but will mainly have impact on the higher frequency band.

However, if the coupling is weak, an increased coupling will make both the higher and lower frequency bands shift to a lower frequency. The coupling capacitance can thus be used to tune both working frequencies.

For a parallel plate capacitor, $C \propto (\varepsilon_r \cdot A)/d$. Based on this, the loading capacitance can be increased by reducing the spacing between the antenna segments at the coupling area and/or increasing the length L2, or increasing the width of the coupling area.

To reduce the impact of the power cables, the diameter of the glass stem can also be tuned in the design, to ensure a minimum distance between the over-molded second antenna segment and any power cables. This thereby guarantees a particular level of performance. A larger diameter however also results in a higher larger equivalent dielectric constant $\varepsilon_r$. The effective dielectric constant is typically between the dielectric constant for air (around 1) and glass (around 5.5), which mainly depends on the thickness of the glass. It can be used to reduce the actual antenna length to $\lambda/(4\sqrt{\varepsilon_r})$.

The use of top loading as mentioned above increases the effective antenna length, or it can be used to tune the antenna input impedance. For the case of a T-shaped second antenna segment, if the length of the top piece 56 in FIG. 3 is L4, the electrical length of second antenna segment becomes L2+L3+L4/2.

The influence of the antenna design on the electrical performance has been modeled. An example is taken with L1=10 mm, L2=10 mm, L3=15 mm, g=0.5 mm, where g is the spacing between the antenna segments in the coupling area. The antenna segments are modeled as formed by a metal sheet with a 1 mm width.

Figure 5:
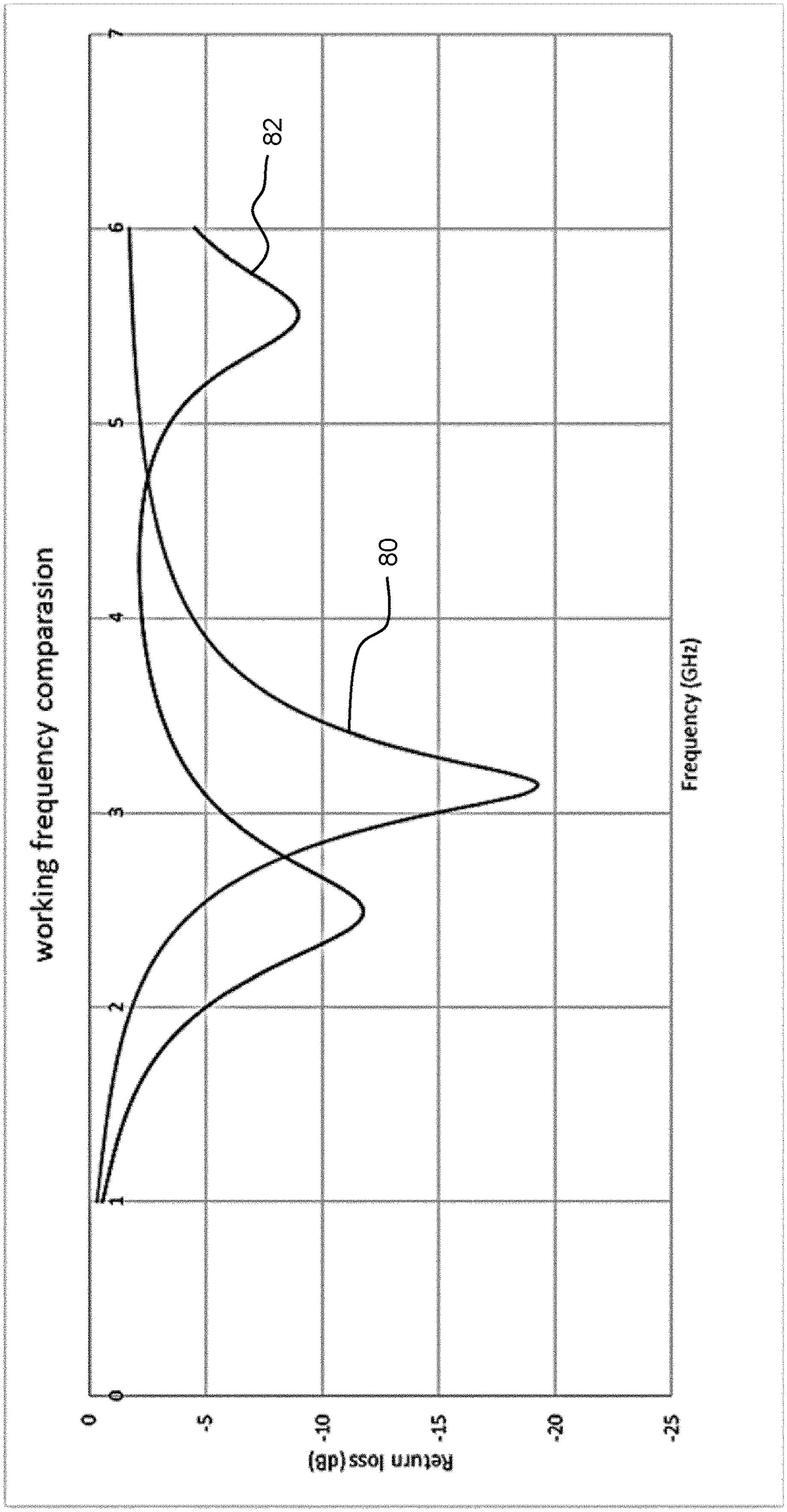
FIG. 5 shows as the frequency response (as return loss vs frequency) for the first antenna segment only, and for the combined antenna design.

FIG. 5 shows as plot 80 the frequency response (as return loss vs frequency) for a given design of the first antenna segment only, and as plot 82 the frequency response for the combined antenna design when a second antenna segment is added to the design of plot 80. The working frequency band in the plot 80 corresponds to a wavelength involving L1+L2. A high working frequency band in the plot 82 corresponds to a wavelength involving L1 and C (which depends on L2), which is effectively smaller than L1+L2, so the frequency band in the plot 80 can be deemed as being shifted to a higher frequency band than the first antenna segment alone by the decreased wavelength length.

The return loss (S11) has a less deep valley because of the smaller input impedance. This can be tuned with lumped components. The low working frequency band of the plot 82, as described above, corresponds to a wavelength involving L1+L3 and the coupling coefficient, thus the frequency band is substantially lower than the high working frequency band. In plot 82, by enabling dual band operation, for example to operate in a band including 2.4 GHz and a band including 5 GHZ, the single antenna ca be used in a dual mode application such as dual mode with WiFi or 5G WiFi and BLE/Zigbee, etc.

FIG. 6 shows the over-molding assembly process.

As shown in FIG. 6A, the second antenna segment 50 is inserted into the upper part 62 and integrated with the glass stem 66 with a high temperature firing process in the region 90.

FIG. 6B shows one resulting structure with round corners, and FIG. 6C shows another resulting structure with a square corner. The second antenna segment is over-molded by a bottom section of the stem 66 which extends below the top of the upper part 62.

Figure 7:
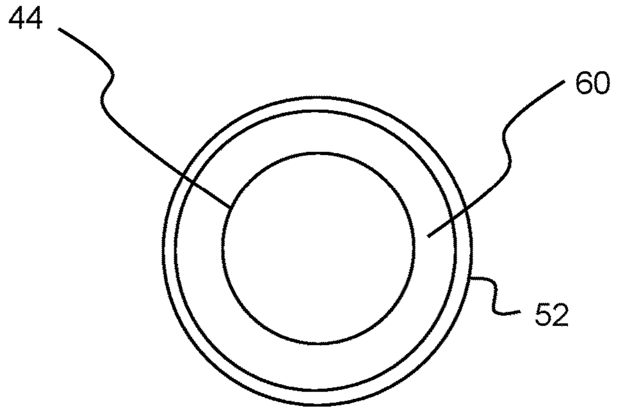
FIG. 7 shows that the end portion may comprise a linear structure and the coupling portion may comprise a tubular structure concentrically arranged around the end portion.

In the example above, the end portion 44 and coupling portion 52 comprise linear structures, side by side. FIG. 7 shows that the end portion 44 may instead comprise a linear structure (e.g. a cylindrical pillar) surrounded by the over-molded glass 60. The coupling portion 52 may comprise a tubular structure concentrically arranged around the end portion 44. This coaxial structure can achieve a larger coupling capacitance with a same distance between the two antenna segments. FIG. 7 shows this coupling in a cross-sectional view:

Thus, different designs are possible for the overlapping parts of the two antenna segments. The design may however be such that the upper part 62 (which mounts the second antenna segment) can be mounted over the base part 12 (which houses the first antenna segment) in any rotational orientation while maintaining a same resulting antenna function.

In the example above, the second antenna segment extends down from the top of the upper part into the internal volume 64. The second antenna segment may instead extend above the dome structure of the upper part, into the stem. This further addresses the problem of a lack of space of the internal volume between the base part and the upper part.

Figure 8:
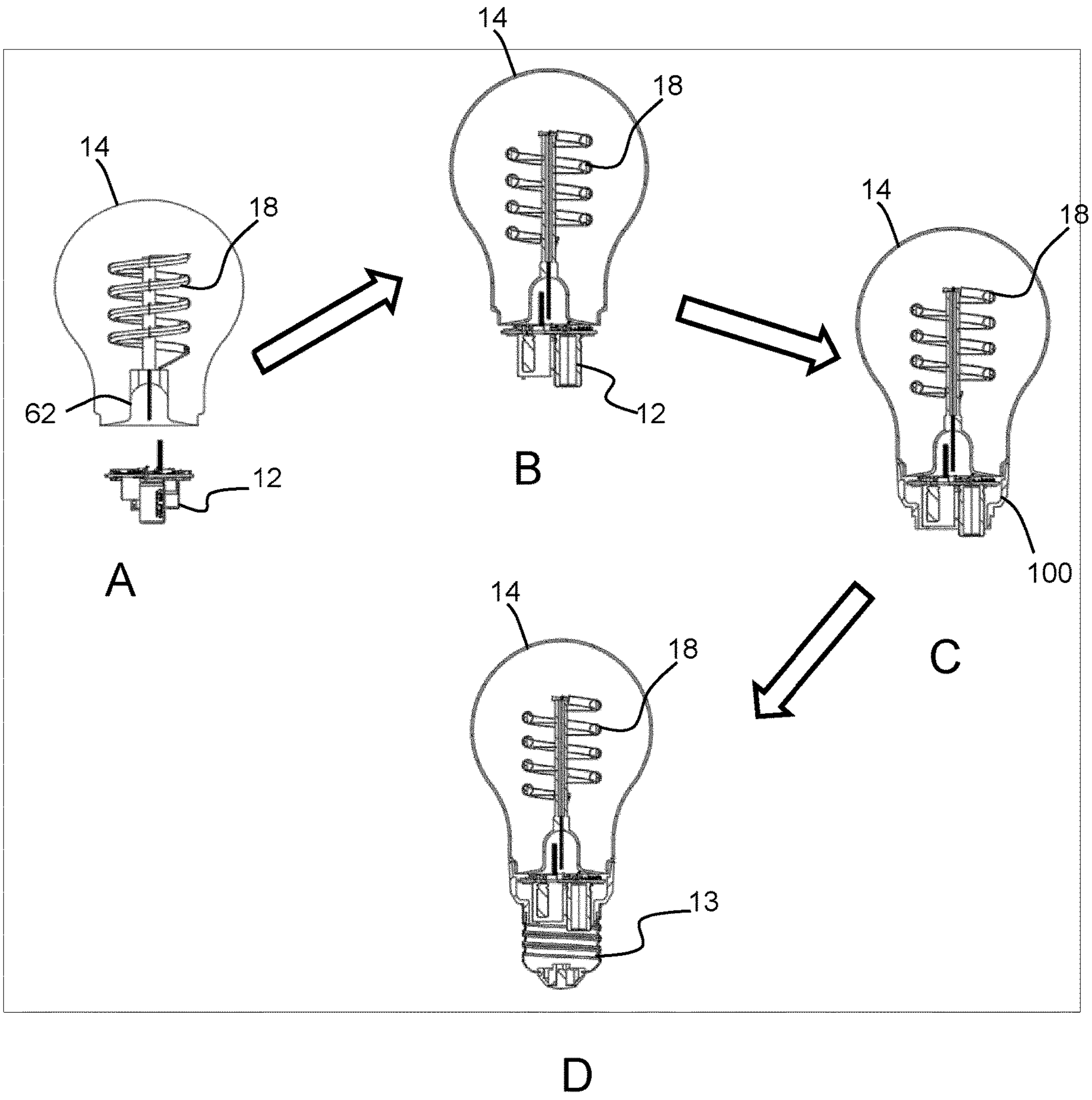
FIG. 8 shows an assembly process.

FIG. 8 shows an assembly process.

FIG. 8A shows the upper part 62 and upper part 14 already sealed together to form a top unit, together with the separate base unit 12. The feed wires for the light source are also provided through the upper part 62 to enable connection to the lighting driver in the base unit 12. These power cables will be sealed using the same firing step (of FIG. 6) used to over-mold the second antenna segment. The power cables are omitted in the figures.

The top unit and base unit are brought together in FIG. 8B. They are coupled together in FIG. 8C with an interface part 100, which is a bottom cover for the driver. The interface part 100 could be an insulator. In FIG. 8D, the end cap is fitted to the interface part 100. The assembly is simplified in that any relative orientation of the base part and the top unit can be used. Note that there are also power wires from the driver to the end cap, via the bottom cover, and these power wires are not shown.

Only one design of bulb has been shown with a screw connector. The invention may be applied to any bulb, or indeed any lighting device more generally, and may be used with any electrical connector type.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A lighting device comprising a light source;

a base part; and an upper part mounted over the base part, wherein there is an internal volume between the base part and the upper part, the lighting device further comprising, located within the internal volume:

a first antenna segment having a first length extending outwardly from the base part towards the internal volume; and a second antenna segment held by the upper part and mounted partially over the first antenna segment, having a second length parallel with the first length, the first and second antenna segments being physically separated but electrically coupled via a non-contact electric and/or magnetic field electrical coupling, wherein the second antenna segment extends outwardly beyond the end of the first antenna segment.

2. The lighting device of claim 1, wherein the first antenna segment is sized to radiate a RF signal in a first frequency band, preferably including 5 GHz, and the first segment and the second segment together are sized to radiate a RF signal in a second frequency band lower than the first frequency band, preferably including 2.4 GHz.

3. The lighting device of claim 1, wherein the electrical coupling comprises a capacitive coupling, wherein preferably the coupling coefficient of the capacitive coupling influences the second frequency band with an inverse relationship.

4. The lighting device of claim 1, wherein the first antenna segment comprises a base portion near the base part and an end portion, and the second antenna segment comprises a coupling portion and a radiator portion further from the base portion than the coupling portion, and, in between the base portion and the radiator portion, the end portion and the coupling portion are adjacent along their length direction thereby to form the electrical coupling.

5. The lighting device of claim 4, wherein:

the end portion and the coupling portion are side-by-side linear structures; or the end portion comprises a linear structure and the coupling portion comprises a tubular structure around the end portion.

6. The lighting device of claim 4, wherein the radiating portion comprises:

a linear structure; or a linear structure with a perpendicular end piece.

7. The lighting device of claim 4, wherein:

the length of the first antenna segment corresponds approximately to a quarter wavelength of a first, for example central, frequency in the first frequency band; and the combined length of the base portion and the radiator portion corresponds approximately to a quarter wavelength of a second, for example central, frequency in the second frequency band.

8. The lighting device of claim 1, further comprising an electrical connector cap adapted to be connected to an external power supply, and the base part at least partially fits into the electrical connector cap at a side opposite from the first antenna segment.

9. The lighting device of claim 8, further comprising a lamp envelope to be sealed with the upper part so as to accommodate the light source, wherein the upper part, at a side facing the lamp envelope, comprises a glass stem projecting towards the lamp envelope.

10. The lighting device of claim 9, wherein the glass stem comprises a plurality of hanging branches for hanging the light source, wherein the light source comprises a LED strip or LED filament.

11. The lighting device of claim 9, wherein the upper part comprises a dome structure which fits over the base part, wherein the dome structure is adapted to provide the internal volume into which the first antenna segment projects and in which the second antenna segment is suspended.

12. The lighting device of claim 11, further comprising an insulating over-molding sleeve adapted to wrap at least part of the second antenna segment.

13. The lighting device of claim 11, wherein the second antenna segment extends above the dome structure, preferably into the stem.

14. The lighting device of any one of claim 1, wherein the base part comprises a RF transceiver circuit which couples to the first antenna segment.

15. The lighting device of claim 1, wherein the base part comprises a lighting driver for driving the light source.

* * * * *